United States Patent
Evanson et al.

(10) Patent No.: US 9,469,047 B2
(45) Date of Patent: Oct. 18, 2016

(54) MULTI-COMPONENT COATING METHOD FOR POROUS SUBSTRATES

(71) Applicant: Valspar Sourcing, Inc., Minneapolis, MN (US)

(72) Inventors: Kevin W. Evanson, Maple Grove, MN (US); Brian L. Marty, Oakdale, MN (US); Stephen M. Carlson, Burnsville, MN (US); Andrew Ubel, St. Paul, MN (US)

(73) Assignee: Valspar Sourcing, Inc., Minneapolis, MN (US)

( * ) Notice: Subject to any disclaimer, the term of this patent is extended or adjusted under 35 U.S.C. 154(b) by 88 days.

(21) Appl. No.: 14/218,548

(22) Filed: Mar. 18, 2014

(65) Prior Publication Data

US 2014/0199486 A1    Jul. 17, 2014

Related U.S. Application Data

(63) Continuation of application No. 13/442,732, filed on Apr. 9, 2012, now Pat. No. 8,697,190, which is a continuation of application No. 12/162,251, filed as (Continued)

(51) Int. Cl.

| | |
|---|---|
| *B05D 3/04* | (2006.01) |
| *B05D 3/10* | (2006.01) |
| *B28B 11/04* | (2006.01) |
| *C04B 41/00* | (2006.01) |
| *C04B 41/52* | (2006.01) |
| *C04B 41/71* | (2006.01) |

(52) U.S. Cl.
CPC ............ *B28B 11/04* (2013.01); *C04B 41/009* (2013.01); *C04B 41/52* (2013.01); *C04B 41/71* (2013.01)

(58) Field of Classification Search
CPC ..... B28B 11/04; C04B 41/009; C04B 41/52; C04B 41/71; C04B 41/4505; C04B 41/455
See application file for complete search history.

(56) References Cited

U.S. PATENT DOCUMENTS

| | | |
|---|---|---|
| 3,266,971 A | 8/1966 | Miller, Jr. et al. |
| 4,185,132 A | 1/1980 | Gurney |
| 4,314,652 A * | 2/1982 | Cooper ............................ 221/1 |
| 4,375,498 A | 3/1983 | Le Minez et al. |

(Continued)

FOREIGN PATENT DOCUMENTS

| | | |
|---|---|---|
| EP | 1589083 A2 | 10/2005 |
| WO | 9962623 A1 | 12/1999 |

(Continued)

OTHER PUBLICATIONS

English Translation of First Office Action from Chinese counterpart Application No. 200780011367.1, dated Jun. 16, 2011, 2 pp.

(Continued)

*Primary Examiner* — Michael Wieczorek
(74) *Attorney, Agent, or Firm* — Shumaker & Sieffert, P.A.

(57) ABSTRACT

The disclosure relates to a coating method including the steps of providing a multi-component coating composition including two or more components, applying each component to a porous substrate, mixing each component with at least one other component thereby causing at least two components to undergo a chemical reaction.

14 Claims, 3 Drawing Sheets

Related U.S. Application Data application No. PCT/US2007/002347 on Jan. 30, 2007, now abandoned.

(60) Provisional application No. 60/764,044, filed on Jan. 31, 2006, provisional application No. 60/773,482, filed on Feb. 15, 2006, provisional application No. 60/802,185, filed on May 19, 2006, provisional application No. 60/802,186, filed on May 19, 2006, provisional application No. 60/819,505, filed on Jul. 7, 2006.

(56) References Cited

U.S. PATENT DOCUMENTS

| | | | | |
|---|---|---|---|---|
| 4,939,191 | A | * | 7/1990 | Kataoka et al. ............... 524/5 |
| 5,871,824 | A | | 2/1999 | Bates |
| 6,136,383 | A | | 10/2000 | Schwartz et al. |
| 6,376,579 | B1 | | 4/2002 | Mishra et al. |
| 6,413,588 | B1 | * | 7/2002 | Pettus et al. ............... 427/327 |
| 8,697,190 | B2 | | 4/2014 | Evanson et al. |
| 2005/0208285 | A1 | * | 9/2005 | Lyons et al. ............... 428/292.1 |
| 2009/0214791 | A1 | | 8/2009 | Evanson et al. |

FOREIGN PATENT DOCUMENTS

| | | |
|---|---|---|
| WO | 03076536 A1 | 9/2003 |
| WO | WO 2006034082 A1 * | 3/2006 |

OTHER PUBLICATIONS

Second Office Action from Chinese counterpart Application No. 200780011367.1, dated Mar. 31, 2012, 6 pp.

Examiner's First Report from Australian counterpart Patent Application No. 2007282141, dated Apr. 27, 2010, 3 pp.

International Preliminary Report on Patentability from international application No. PCT/US2007/002347, dated Jul. 11, 2008, 8 pp.

Examiner's Second Report from Australian counterpart Patent Application No. 2007282141, dated Sep. 27, 2011, 2 pp.

Reply to Office Action dated Jun. 16, 2011, from Chinese counterpart Application No. 200780011367.1, dated Nov. 1, 2011, 14 pp.

Prosecution History from U.S. Appl. No. 12/162,251, dated Jul. 15, 2011 through Jun. 21, 2012, 57 pp.

Prosecution History from U.S. Pat. No. 8,697,190, dated Feb. 26, 2013 through Nov. 20, 2013, 58 pp.

* cited by examiner

MULTI-COMPONENT COATING METHOD FOR POROUS SUBSTRATES

CROSS REFERENCE TO RELATED APPLICATIONS

This application is a continuation of U.S. application Ser. No. 13/442,732, filed on Apr. 9, 2012 which is a continuation of U.S. application Ser. No. 12/162,251, filed on Jan. 30, 2007, (now abandoned) entitled, "MULTI-COMPONENT COATING METHOD FOR POROUS SUBSTRATES," which claims the benefit of PCT Application No. PCT/US2007/002347, filed Jan. 30, 2007, U.S. Provisional Application Ser. No. 60/764,044 filed Jan. 31, 2006, U.S. Provisional Application No. 60/773,482 filed Feb. 15, 2006, U.S. Provisional Application No. 60/802,185 filed May 19, 2006, U.S. Provisional Application No. 60/802,186 filed May 19, 2006, and U.S. Provisional Application No. 60/819,505 filed Jul. 7, 2006. The entire content of each of these applications is incorporated herein by reference in its entirety.

TECHNICAL FIELD

This disclosure relates to methods for applying a multi-component coating composition to a porous substrate.

BACKGROUND

Porous materials such as, for example, fiber reinforced cement materials, gypsum wall board and the like, are increasingly being used as internal and external cladding panels in a variety of building construction applications. These porous materials have good fire resistance and barrier characteristics, and may be produced at a reasonable cost.

Fiber-reinforced cement materials may be manufactured by applying a finish to one or more surfaces of the panel. The finish may be a coating that prevents or reduces water penetration into porous surfaces of the panel. The coating is typically applied to a surface of the fibrous cement material in a liquid state, but subsequently undergoes a chemical transformation to a solid-like cured state. Two-part reactive systems, for example two-part epoxy resins that form a reactive mixture upon combining a base component with an epoxy component, have been used as coatings for fiber reinforced cement materials.

It is particularly desirable to apply the coating to at least the exterior face and edges of the fibrous cement panel to prevent water penetration and/or provide improved adhesion to additional protective and decorative coatings. Various coating methods, for example, spray coating and sponge-roll coating, have been used for applying coatings to the surfaces of fiber reinforced cement materials.

Unfortunately, multi-part reactive coating systems, such as two-part epoxy resins, have a limited pot life. After the components are combined to initiate the curing reaction and form a reactive mixture, if the mixture is not applied to a substrate within a relatively short period of time the mixture must be discarded. This wastes coating materials and requires extensive coater down time to clean the coating fluid delivery system, particularly if a coating line stoppage occurs. In addition, once the materials are mixed and the curing reaction begins, the properties of the mixture are constantly changing, so control of process variables in the coating process may be difficult.

SUMMARY

In general, this disclosure relates to coating methods for applying a multi-component coating composition to a porous substrate, for example, a fibrous cement substrate. This disclosure further relates to coating methods for applying to porous substrates a multi-component coating composition capable of undergoing a chemical curing reaction.

In one embodiment, this disclosure is directed to a method including providing a multi-component coating composition including two or more components, applying each component to a porous substrate, mixing each component with at least one other component, thereby causing at least two components to undergo a chemical reaction, and allowing at least some of the components to penetrate into the substrate.

In other embodiments, mixing takes place before applying each component to the porous substrate. In other embodiments, mixing occurs upon applying each component to the porous substrate. In further exemplary embodiments, the method includes the step of removing at least a portion of the applied multi-component coating composition from a surface of the porous substrate.

In certain exemplary embodiments, the porous substrate may be a fibrous cement substrate. In some embodiments the fibrous cement substrate may be a sheet having a plurality of edges adjoining a first major surface, and a second major surface adjoining the edges opposite the first major surface. In some embodiments, each component is applied to at least the first major surface and at least one of the edges of the substrate sheet. In other exemplary embodiments, each component is also applied to the second major surface and each of the edges.

In certain embodiments, the first component may include an amino-functional chemical compound, and the second component may include an oxirane-functional chemical compound.

In other embodiments, this disclosure is directed to a method including providing a multi-component coating composition including at least a first amino-functional polymer component and a second oxirane-functional polymer component contained in separate containers, applying each component to a fibrous cement substrate, mixing the first component with at least the second component to form a reacting mixture, and allowing at least some of the reacting mixture to penetrate into the fibrous cement substrate.

In further embodiments, this disclosure is directed to a method including providing a multi-component coating composition including at least a first amino-functional compound and a second oxirane-functional compound contained in separate containers, applying each component to a porous substrate, mixing the first component with at least the second component, thereby forming a reacting mixture undergoing a chemical reaction, and allowing at least some of the reacting mixture to penetrate into the porous substrate.

According to some aspects of the invention, a method for coating a fibrous cement substrate may provide certain advantages, including longer pot life of reactive coating components, less waste of coating materials, reduced downtime for cleaning of the coating fluid delivery system, and reduced coating materials cost. Coating methods according to some embodiments of the present invention may also permit more uniform coating of the edge surfaces of fibrous cement panels, improved wet and dry adhesion of the coated components on the porous substrate, and higher throughput of fibrous cement panels in a continuous coating line, thereby increasing productivity and reducing cost.

The details of one or more embodiments of the invention are set forth in the accompanying drawings and the description below. Other features, objects, and advantages of the invention will be apparent from the description and drawings, and from the claims.

DETAILED DESCRIPTION

Figure 1:
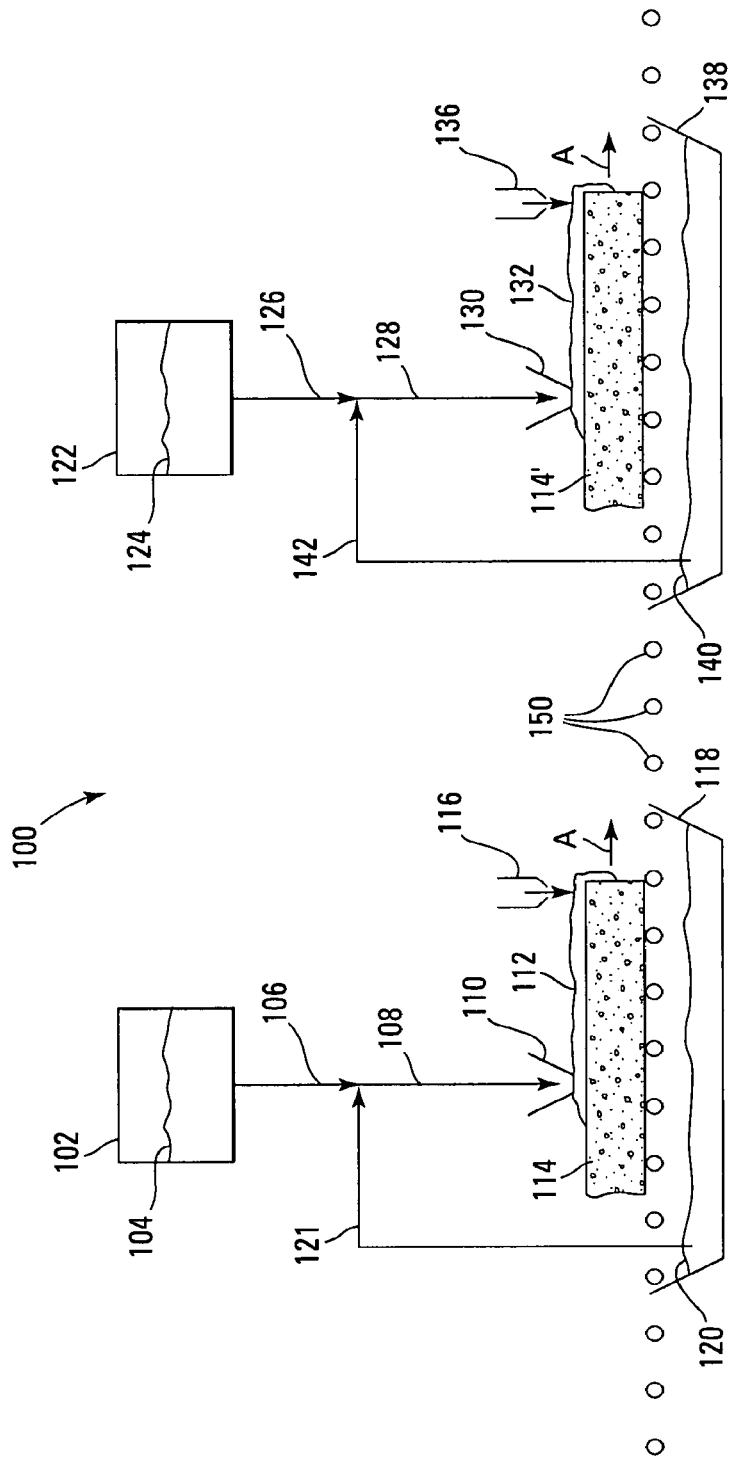
FIG. 1 is a schematic side view diagram illustrating an exemplary method of coating a fibrous cement substrate according to an embodiment of the present invention.

The disclosure relates generally to methods for applying a coating to a substrate that is porous and/or hydrophilic. Any porous material is suitable for use as a substrate, but the following description will focus on porous materials commonly used in the building and construction industry, for example, a fibrous cement substrate (FCS) or a gypsum wall board.

For example, the substrate may be a low density fibrous cement board having a porosity of about 40%-80% by volume, a medium density fibrous cement board having a porosity of about 20-40% by volume, or a high density/compressed fibrous cement board having a porosity of about 2%-20% by volume. Porosity and/or hydrophilicity may be determined using a direct measurement, such as porosimetry, or may be estimated using a qualitative test method such as a water droplet penetration measurement (e.g. the water penetration test described below). As will be described in greater detail below, the porosity and/or hydrophilicity of the substrate may also be modified by mechanical or chemical treatment.

The substrate is typically in the form of a generally polygonal sheet, panel or slab, for example, a generally rectangular sheet. In certain exemplary embodiments, the fibrous cement substrate may be a sheet having a plurality of edges adjoining a first major surface (e.g. an exterior face), and a second major surface (e.g. an interior face) adjoining the edges opposite the first major surface.

The fibrous cement substrate sheets may be produced using a wide variety of processes. For example, the Hatschek process uses a series of rotating drum sieves to deposit sequential layers of de-watered slurry onto an absorbent conveyer and accumulate them on a size roll until the desired sheet thickness has been achieved. However, the green sheets can also be produced using other known methods such as extrusion, casting, molding, Mazza, Magnani, Fourdrinier and roll press processes. The fibrous cement substrate may be sanded, machined, extruded, molded or otherwise formed into any desired shape. The substrate may be fully cured, partially cured or in the uncured "green" state.

A variety of different fibrous cement compositions and methods of making fibrous cement compositions are described in PCT Applications WO 0168547 and WO9845222. The fibrous cement composition used to form the fibrous cement substrate generally includes a plurality of fibers dispersed in an inorganic binder. The binder may include ordinary Portland cement type 1 but may also include other inorganic binders such as gypsum, geopolymer, or other inorganic cements. Suitable fibers include various forms of cellulose fibers, such as bleached or unbleached Kraft pulp.

In particular, a fiber derived from cellulose wood pulp may be used in the fibrous cement composition. Other examples of suitable fibers are ceramic fiber, glass fiber, mineral wool, steel fiber, and synthetic polymer fibers such as polyamides, polyester, polypropylene, polymethylpentene, polyacrylonitrile, polyacrylamide, viscose, nylon, PVC, PVA, rayon, glass ceramic, carbon, or any mixtures thereof. The fibers may also include cellulose fibers with hydrophilic treatments, hydrophobic treatments, biocide treatments, or the like, such as those disclosed in PCT Patent Applications WO 0228796 and WO 0228795.

The fibrous cement composition may also include an aggregate. The aggregate may include milled quartz, amorphous silica, perlite, vermiculite, synthetic calcium silicate hydrate, diatomaceous earth, rice hull ash, fly ash, bottom ash, blast furnace slag, granulated slag, steel slag, mineral oxides, mineral hydroxides, clays, magnesite, or dolomite, polymeric beads, metal oxides and hydroxides, or mixtures thereof.

Additional additives may be optionally incorporated into the fibrous cement composition including but not limited to density modifiers, dispersing agents, silica fume, geothermal silica, fire retardant, viscosity modifiers, thickeners, pigments, colorants, dispersants, foaming agents, flocculating agents, water-proofing agents, organic density modifiers, aluminum powder, kaolin, alumina trihydrate, mica, metakaolin, calcium carbonate, wollastonite, polymeric resin emulsions, or mixtures thereof.

According to one embodiment of the present invention, a coating is applied to a porous substrate using a method including the steps of providing a multi-component coating composition including two or more components that are preferably contained in separate containers. Each component is applied to a porous substrate and mixed with at least one other component, which causes the at least two components to undergo a chemical reaction. At least some of the components preferably penetrate into the porous substrate and form a coating.

The multi-component composition may include at least a first component and a second component, but the composition may also include additional components. The multi-component composition may be a primer, a sealer a topcoat, or other coating composition for application to a fibrous cement substrate. Exemplary coating compositions of the present invention may be used in place of or in addition to prior art "sealers" and "primers." However, the compositions of the present invention may not fit neatly into either category per se and such terms should not be limiting.

In certain exemplary embodiments, the first and second components undergo a chemical reaction with each other or with other components in the multi-component composition upon mixing, as described below.

The first and second components in the multi-component coating composition may vary widely depending on the intended applications, and may include, respectively:

an amino-functional compound and an oxirane-functional compound;

an amide functional compound and an oxirane functional compound;

an amino-functional compound and an isocyanate compound;

an amino-functional compound and a (meth)acrylic functional compound;

a hydroxyl-functional compound and an isocyanate compound;

a hydroxyl-functional compound and a melamine compound; or an acid-functional compound and a melamine compound.

Functional groups are groups available for curing and/or for the formation of crosslinks. Preferred amino-functional chemical compounds are characterized by a molecular structure which includes at least one group selected from NH and $NH_2$. Preferred amide functional compounds include the group $RC=ONH_2$. Oxirane compounds include at least one oxirane functional group, and (meth)acryl groups refers to compounds having acryl and/or methacryl functional groups. Isocyanate compounds include a —NCO radical, while melamine compounds are amino-functional compounds made from melamine and formaldehyde. While any of these components may be present in the multi-component coating composition, for brevity the following description will focus on multi-component coating compositions including an amino-functional compound as the first component and an oxirane-functional compound as the second component.

The amino-functional chemical compound may be a low molecular weight molecule (e.g. having a weight average molecular weight less than about 1000 Daltons), or may be in the form of a polymer or resin (e.g. having a weight average molecular weight greater than about 1000 Daltons). In some embodiments, the amino-functional chemical compound has a plurality of amino groups and is capable of functioning as a cross-linker.

Preferred oxirane-functional chemical compounds are characterized by a molecular structure which includes at least one oxirane chemical group. The oxirane-functional chemical compound may be a low molecular weight molecule (e.g. having a weight average molecular weight less than about 1000 Daltons), or may be in the form of a polymer or resin (e.g. having a weight average molecular weight greater than about 1000 Daltons). In some embodiments, the oxirane-functional chemical compound has a plurality of oxirane groups and is capable of functioning as a cross-linker.

Preferably, the amino-functional chemical compound and/or the oxirane-functional chemical compound are waterborne, water reducible or water dispersible two-component epoxy compositions. Exemplary two-component epoxy compositions include amino-functional phenolic resins (e.g. benzoguanamine resins), and exemplary oxirane-functional chemical compounds include bisphenol epoxy resins, as described in Wicks, Z. W. et al., Organic Coatings Science and Technology, Vol. 1, Chapter XI, pp. 1162-1187.

In this embodiment, the application rate of each component to a porous substrate is determined by the stoichiometric ratio of oxirane-functionality to amino-functionality, which is generally controlled by the equivalent weight of each component and the mixing weight ratio of each component. The application rate is also determined by substrate morphology and porosity and the desired application viscosity. The oxirane-functional and amino-functional components may be applied at differing percent solids (percent non-volatile material) and/or wet film thicknesses to obtain the desired mixing weight ratio. Preferred mixing weight ratios generally vary from about 2:1 to about 1:2, more preferably about 2:1 to about 1:1.2, of oxirane-functional chemical compound to amino-functional chemical compound.

The chemical composition of adjacent coating layers may have an impact on the oxirane/amino mixing weight ratios described above. For example, functional groups may be included in the chemical compounds in adjacent coating layers to react with any excess amine groups which may in some cases allow a larger proportion of the amino functional compound in the mixture.

Conventional solvent-based two-component epoxy resin compositions are highly viscous and tend to have higher emissions of volatile organic compounds (VOC) than waterborne two-part epoxy compositions. These compositions may be thinned (e.g. by adding a carrier liquid to lower the percentage of non-volatile solids and thereby lower the viscosity. Two-component epoxy compositions may be classified as liquid, semi-solid and solid, depending on their molecular weight, which tends to increase in going from liquid to solid form. Although all three types of two-component epoxies may be suitable for use according to the present invention, the liquid and semi-solid types are presently preferred. While not wishing to be bound by any particular theory, we believe that the liquid and semi-solid two-component epoxy resin systems permit reasonably high application solids while maintaining some degree of molecular mobility to facilitate inter-component diffusion and chemical reaction.

The coating compositions may also contain an optional coalescent and many coalescents are known in the art. The optional coalescent is preferably a low VOC coalescent such as is described in U.S. Pat. No. 6,762,230.

In certain embodiments, one or both of the amino-functional chemical compound and the oxirane-functional chemical compound may be chemically blocked to prevent or delay onset of chemical reaction until a desired time, at which time a stimulus is used to de-block the components and permit reaction. For example, amine groups may be blocked to form a ketimene, which can unblock in the presence of moisture. Alternatively or additionally, the blocked component may be heated to facilitate unblocking.

The amino-functional chemical compound and oxirane-functional chemical compound are further characterized as being capable of undergoing chemical reaction (e.g. epoxidation) with at least each other, and optionally with other components present in the multi-component coating composition. For example, the multi-component composition may include at least one catalyst, such as an alcohol or an acid or a base catalyst, suitable for catalyzing the epoxidation chemical reaction. Other catalysts or reaction initiators may also be included in the multi-component coating composition.

Other additives may be included in the multi-component composition to alter or improve the application characteristics of the composition to the fibrous cement substrate. For example, a wetting agent may be used to adjust the surface tension of one or more components of the multi-component composition to alter the wetting characteristics with respect to the fibrous cement substrate. Non-limiting examples of wetting agents include water soluble or water miscible non-ionic surfactants exhibiting an hydrophile-lipophile balance ("HLB") from about 10 to about 20.

In addition or alternatively, a rheology control agent may be added to the multi-component composition to alter the flow and/or leveling characteristics of the composition upon application to the fibrous cement substrate. For example, a rheology control agent may be added to one or more of the components of the multi-component composition to reduce the low shear viscosity of the composition and thereby improve the leveling and/or penetration of the component into the porous substrate. Exemplary rheology control agents include the resin flow modifiers available under the trade designation MODAFLOW from Cytec Industries, Inc., Charlotte, N.C., and acrylic leveling agents available under the trade designations BYK and DISPERBYK from Byk-Chemie, Wesel, Germany.

In certain embodiments, the multi-component coating composition may include at least one carrier liquid. The carrier liquid may be a single chemical compound, but generally the carrier liquid is selected to be a blend of different chemical compounds. The carrier liquid may be aqueous, nonaqueous or substantially nonaqueous. Aqueous carriers include water as a major component, while substantially nonaqueous carrier liquids do not include water as a major component. Nonaqueous carrier liquids contain no water or negligible amounts of water. Preferably, the carrier liquid is selected to be aqueous or substantially nonaqueous. Suitable co-solvents used in combination with water in an aqueous or substantially nonaqueous carrier liquid include water soluble or water miscible alcohols, ketones, esters, and the like. Non-limiting examples of carrier liquids include water (which may include tap water, deionized water, distilled water, and the like), methanol, acetone, 2-butanone, ethyl acetate, and various glycol based ethers.

The carrier liquid constituents and/or the amount of carrier liquid or the percent of non-volatile material (% NVM) dispersed or dissolved in the carrier liquid may be adjusted to obtain a viscosity or surface tension desirable for application of one or more of the components of the multi-component composition to the fibrous cement substrate. For certain non-limiting applications, a suitable weight percentage of non-volatile solids in a component of the multi-component coating composition may be from about 10% to about 60%, more preferably from about 15% to about 55% NVM, most preferably from about 30% to about 50% NVM expressed on a weight basis.

Additional or alternative additives may be included in any or all of the components of the multi-component composition. Suitable additives for use in coating compositions of the present invention are described in Koeske et al., *Paint and Coatings Industry*, April, 2003, pages 12-86. Typical performance enhancing additives that may be employed include surface active agents, pigments, colorants, dyes, surfactants, thickeners, heat stabilizers, leveling agents, anti-cratering agents, curing indicators, plasticizers, fillers, sedimentation inhibitors, ultraviolet-light absorbers, optical brighteners, and the like to modify properties.

In some embodiments, the first and second components of the multi-component composition are mixed together subsequent to leaving their respective storage containers, typically a closed holding vessel such as a tank. In certain embodiments, mixing takes place before applying each component to the fibrous cement substrate. In certain exemplary embodiments, mixing may take place in an in-line mixer, for example, those available from Chemineer, Inc., Andover, Mass., under the trade designation Kenics Static Mixer.

Mixing may additionally or alternatively take place upon application of the first and second components to a surface of the porous substrate. While not wishing to be bound to any particular theory, we believe that mixing of the first and second components may be achieved, for example, by inter-molecular diffusion driven by concentration gradients, surface tension gradients and/or thermal gradients between the first and second components upon mixing and/or application to the porous substrate.

Various methods may be used for applying the multi-component coating to the fibrous cement substrate. For example, one or more of brush coating, knife coating, direct roll coating, reverse roll coating, spray coating, extrusion die coating, curtain coating, flood coating and vacuum coating may be used to apply one or more component of the multi-component coating to the substrate.

In general, the application of the first, second and additional optional components of the multi-component composition may be carried out in any order. However, for sequential application methods, it is presently preferred that the amine-functional chemical compound be applied before the oxirane-functional chemical compound. Currently available data indicate that this order of application provides superior sealant performance and better inter-coat adhesion for multi-layer coatings.

In one embodiment, the first and second components may be applied "wet-on-wet." However, depending on the application technique and substrate characteristics, a drying step may be included after application of the first, second, or subsequent components to the porous substrate. While not wishing to be bound by any particular theory, a drying step may permit the hardening, curing, or otherwise immobilization of an earlier applied component, thereby allowing a later applied component to be applied without contaminating the second component's fluid delivery system. This may be particularly important in flat-line applications using curtain coating, flood coating, roll coating, and the like.

In certain additional embodiments, the first component of the multi-component coating composition is applied to a surface of the fibrous cement substrate before a second component of the multi-component coating composition is applied to the surface, and a first component penetration time is allowed to elapse before applying the second component. In certain exemplary embodiments, the first component applied to a surface of the fibrous cement substrate includes an amino-functional chemical compound, and the second component includes an oxirane-functional chemical compound.

The desired first component penetration time may be estimated using a porosity or hydrophilicity test, such as a droplet penetration test. In one exemplary water droplet penetration test, a single droplet of deionized water (as an assessment of the porosity and/or hydrophilicity of the porous substrate to be coated) or alternatively, of one of the components to be coated (as an assessment of the penetration rate of the component into the porous substrate after coating), is placed on a surface of the porous substrate and the time required for the droplet to penetrate into the substrate pores is determined with a timer or stopwatch.

In certain embodiments, the uncoated fibrous cement substrate exhibits a water droplet penetration time of from about 0.1 to about 5 seconds, more preferably from about 1 to about 2 seconds, when tested according to the water droplet penetration test method described above. In other embodiments, the coated fibrous cement substrate exhibits a water droplet penetration time of from about 2 seconds to about 15 seconds, more preferably from about 5 seconds to about ten seconds, when tested according to the water droplet penetration test method described above after application and curing of a multi-component composition according to the present invention. Preferably, a first-coated component of the multi-component composition exhibits a penetration time of about 0.5 to about 5 seconds when tested according to the component droplet penetration test method described above. Preferably, a second-coated component of the multi-component composition exhibits a penetration time of about 5 to about 15 seconds when tested according to the component droplet penetration test method described above.

In further exemplary embodiments, the method includes the step of removing at least a portion of the multi-component coating composition from a surface of the substrate. In some embodiments, removing at least a portion of the multi-component coating composition from a surface of the substrate takes place after at least some of the components penetrate into the substrate. In other embodiments, the method includes the step of applying at least a portion of the multi-component coating composition removed from the surface of the substrate to a second fibrous cement substrate surface, for example, a second fibrous cement substrate sheet or a different portion of the surface of the first substrate sheet.

Removal of at least a portion of the multi-component composition applied to the substrate surface may be achieved using a number of methods. For example, the applied component may simply be permitted to wick or penetrate into the porous substrate by allowing sufficient time to elapse before applying a second component as described above. Alternatively, at least a portion of the multi-component coating composition may be removed from the surface of the substrate by directing a gas stream against at least a portion of the coated surface to blow off at least a portion of the multi-component composition. Preferably, an air knife is used to direct an air stream, which may optionally be heated, against the substrate surface to remove at least a portion of the multi-component coating composition. In certain preferred embodiments, at least a portion of the removed portion of the multi-component composition is recovered, recycled and applied to a second substrate surface.

In additional embodiments, the method includes the step of mixing at least a portion of the multi-component coating composition removed from the surface of the substrate with at least a portion of the multi-component coating composition not previously applied to the substrate to form a recycled coating mixture before applying the recycled coating mixture to a surface of a second substrate.

Since, as noted above, fiber cement substrates typically have a layered construction, to provide a uniform finish and at least partially seal the substrates against water intrusion and other environmental damage, each component is preferably applied to at least the first major surface and at least one of the edges of the substrate sheet. In other exemplary embodiments, each component is also applied to the second major surface and each of the edges. The applied film thickness may be varied by controlling the rheology of the coating fluid, for example by controlling the component's % NVM, or by controlling the application rate.

In some additional embodiments, the multi-component coating composition may be applied to the fibrous cement substrate to obtain an overall dry coating weight for the multi-component coating composition of from about 0.5 g/m$^2$ to about 75 g/m$^2$ (more preferably from about 1 to 40 g/m$^2$, and most preferably from 5 to 25 g/m$^2$), and an overall dry film thickness of from about 0.05 to about 3 mil (from about 1.25 to about 75 microns), more preferably from about 0.1 to about 1 mil (from about 2.5 to about 25 microns). Preferably, a first-applied component is applied to the porous substrate to obtain a dry coating weight of from about 1 g/m$^2$ to about 20 g/m$^2$, and a second-applied component is applied to the porous substrate to obtain a dry coating weight of from about 1 g/m$^2$ to about 20 g/m$^2$.

The invention will now be described with respect to certain exemplary embodiments illustrated by the Figures and the Examples. It should be understood that by specifying an order in the present disclosure (e.g. an order of steps to be performed, an order of layers on a substrate, etc.), it is not meant to preclude intermediates between the items specified, as long as the items appear in the order as specified.

Turning now to the figures, FIG. 1 illustrates a multi-component coating method 100 according to an embodiment of the present invention. In this illustrative embodiment, a first component 104 is first applied to a substrate 114 at a first application station, and subsequently a second component 124 is applied to the coated substrate 114' at a second application station in an in-line sequential coating process.

FIG. 1 shows a first storage container, typically a tank 102, containing a first component 104 of a multi-component composition. For example, the first component may be an amino-functional chemical compound. A supply fluid stream 106 of the first component 104 is fed from the first storage tank 102 to an applicator 110.

The applicator 110 may be any suitable coating device as described above; however, a flood coater is shown for illustrative purposes. The applicator 110 applies the first component 104 to a substrate 114, which is shown for illustrative purposes as a fibrous cement substrate sheet moving along a conveyor system comprising a plurality of rollers 150. The applied coating stream 108 forms a flood coat 112 on at least one surface of the substrate 114. The surface may include one or more major surfaces such as a face of the sheet, and one or more edge surfaces as shown in FIG. 1.

Optionally, as shown in FIG. 1, at least a portion 120 of the applied coating stream 128 of the first component is removed from a surface of the substrate 114. FIG. 1 illustrates use of an air knife 116 that directs air, which may be heated, against the surface of the substrate 114 after passage of a first component penetration time; however, any suitable method may be used to remove a portion of the coating from a surface of the substrate 114, including penetration of the coating into the pores of the substrate 114. For illustrative purposes only, the first component penetration time is determined as the time required for a point on the substrate to move from the applicator 110 to the air knife 116, and may be controlled by controlling the linear velocity of the substrate 114 along the plurality of rollers 124 making up the conveyor system in the direction shown by the arrow A.

A portion 120 of the applied first composition removed from the surface of the substrate 114 may be collected in a pan 118. At least some of the portion 120 of the applied first composition removed from the surface of the substrate 114 and collected in pan 118 may be recycled in a recycle fluid stream 121, which optionally mixes with the supply fluid stream 106 of the first component 104, to form the applied coating stream 108 to the applicator 110. Alternatively, at least some of the portion 120 of the applied first composition removed from the surface of the substrate 114 and collected in pan 118 may be recycled in a recycle fluid stream 121, which optionally alternates with the supply fluid stream 106 of the first component 104, to form the applied coating stream 108 to the applicator 110.

Subsequently, the substrate (bearing the first component) 114' passes to a second application station where a second storage container, typically a tank 122, contains a second component 124 of a multi-component composition. For example, the second component may be an oxirane-functional chemical compound. A supply fluid stream 126 of the second component 124 is fed from the second storage tank 122 to a second applicator 130.

The second applicator 130 may be any suitable coating device as described above; however, a flood coater is shown for illustrative purposes. The applicator 130 applies the second component 124 to the substrate (bearing the first component) 114'. The applied coating stream 128 forms a flood coat 132 on at least one surface of the substrate 114'. The surface may include one or more major surfaces such as a face of the sheet, and one or more edge surfaces as shown in FIG. 1.

Optionally, as shown in FIG. 1, at least a portion 140 of the applied coating stream 128 of the second component is removed from a surface of the substrate 114'. FIG. 1 illustrates use of an air knife 136 that impinges air, which may be heated, against the surface of the substrate 114' after passage of a second component penetration time to remove a portion of the applied mixed feed stream 108. However, any suitable method may be used to remove a portion of the coating from a surface of the substrate 114', including penetration of the coating into the pores of the substrate 114'. For illustrative purposes only, the second component penetration time is determined as the time required for a point on the substrate to move from the second applicator 130 to the second air knife 136, and may be controlled by controlling the linear velocity of the substrate 114' along the plurality of rollers 124 making up the conveyor system in the direction shown by the arrow A.

A portion 140 of the applied first composition removed from the surface of the substrate 114' may be collected in a pan 138. At least some of the portion 140 of the applied first composition removed from the surface of the substrate 114' and collected in pan 138 may be recycled in a recycle fluid stream 142, which optionally mixes and/or alternates with the supply fluid stream 126 of the second component 124 to form the feed stream 128 to the second applicator 130.

Figure 2:
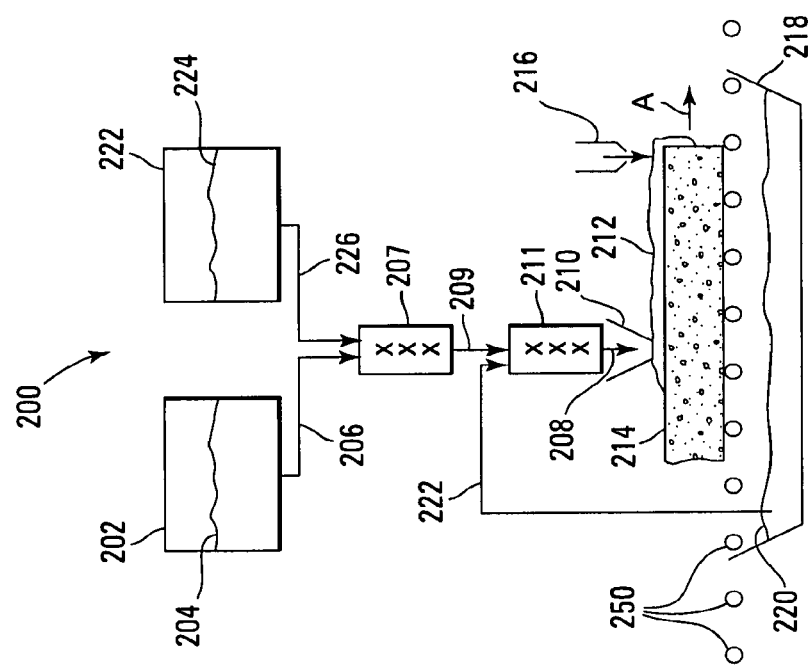
FIG. 2 is a schematic side view diagram illustrating an exemplary method of coating a fibrous cement substrate according to another embodiment of the present invention.

FIG. 2 illustrates a multi-component coating method 200 according to another embodiment of the present invention using two mixers 207 and 211. In this illustrative embodiment, a first component 204 is mixed with a second component 224 before application to a substrate 214 at a single application station.

FIG. 2 shows a first storage container, typically a tank 202, containing a first component 204 of a multi-component composition. For example, the first component may be an amino-functional chemical compound. A supply fluid stream 206 of the first component 204 is fed from the first storage tank 202 to a first mixer 207. For illustration purposes only, a static in-line mixer 207 is shown in FIG. 2, although other types of mixers may be used. FIG. 2 also shows a second storage container, such as a tank 222, containing a second component 224 of a multi-component composition. For example, the second component may be an oxirane-functional chemical compound. A supply fluid stream 226 of the second component 224 is fed from the second storage tank 222 to the mixer 207.

A first mixed feed stream 209 including the first component 204 and the second component 224 is fed from the first mixer 207 to a second mixer 211, and the second mixed feed stream 208 is fed to an applicator 210. The applicator 210 may be any suitable coating device as described above; however, a flood coater is shown for illustrative purposes. The applicator 210 applies the second mixed feed stream 208 containing the first component 204 and the second component 224 to a substrate 214, which is shown for illustration purposes as a fibrous cement substrate sheet moving in the direction of arrow A along a conveyor system comprising a plurality of rollers 250. The applied second mixed feed stream 208 forms a flood coat 212 on at least one surface of the substrate 214. The surface may include one or more major surfaces such as a face of the sheet, and one or more edge surfaces as shown in FIG. 2.

Optionally, as shown in FIG. 2, at least a portion 220 of the applied second mixed feed stream 208 is removed from a surface of the substrate 214. FIG. 2 illustrates use of an air knife 216 that impinges air, which may be heated, against the surface of the substrate 214 after passage of at least one component penetration time to remove a portion of the applied mixed feed stream 208. However, any suitable method may be used to remove a portion of the coating from a surface of the substrate 214, including penetration of the coating into the pores of the substrate 214. For illustrative purposes only, the component penetration time is determined as the time required for a point on the substrate to move from the applicator 210 to the air knife 216, and may be controlled by controlling the linear velocity of the substrate 214 along the rollers 250.

A portion 220 of the applied second mixed feed stream 208 removed from the surface of the substrate 214 may be collected in a pan 218. At least some of the portion 220 of the applied second mixed feed stream 208 removed from the surface of the substrate 214 and collected in pan 218 may be recycled in a recycle fluid stream 222, which mixes with the first mixed feed stream 209, including the first component 204 and the second component 224, before entering the second mixer 211 and forming the second mixed feed stream 208 fed to the applicator 210.

Figure 3:
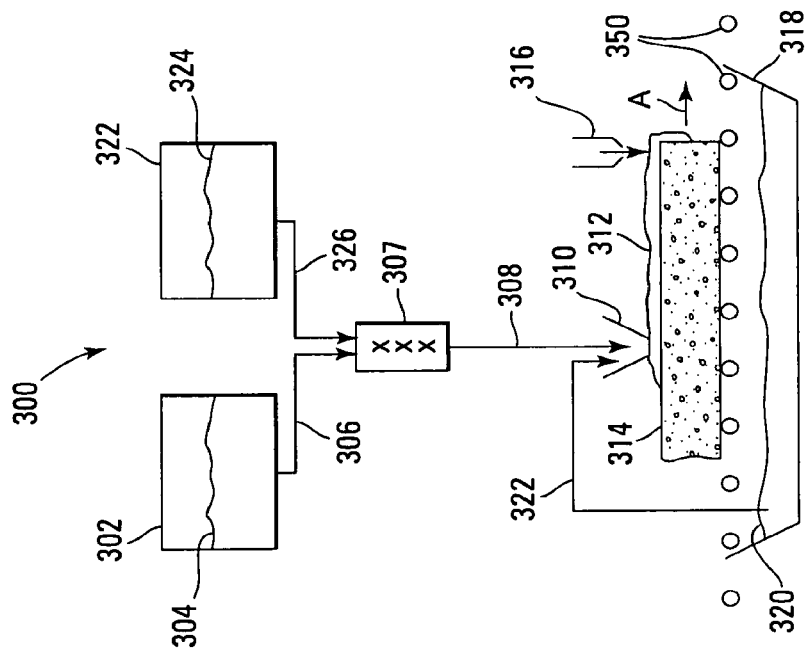
FIG. 3 is a schematic side view diagram illustrating an exemplary method of coating a fibrous cement substrate according to an additional embodiment of the present invention.

FIG. 3 illustrates a multi-component coating method 300 according to an additional embodiment of the present invention using a single mixer 307. In this illustrative embodiment, a first component 304 is mixed with a second component 324 before application to a substrate 314 at a single application station.

FIG. 3 shows a first storage container, typically a tank 302, containing a first component 304 of a multi-component composition. For example, the first component may be an oxirane-functional chemical compound. A supply fluid stream 306 of the first component 304 is fed from the first storage tank 302 to a mixer 307. For illustration purposes only, a static in-line mixer 307 is shown in FIG. 3, although other types of mixers may be used. FIG. 3 also shows a second storage container such as a tank 322 containing a second component 324 of a multi-component composition. For example, the second component may be an amino-functional chemical compound. A supply fluid stream 326 of the second component 324 is fed from the second storage tank 322 to the mixer 307.

A mixed feed stream 308 including the first component 304 and the second component 324 is fed from the mixer 307, and the mixed feed stream 308 is fed to an applicator 310. The applicator 310 may be any suitable coating device as described above; however, a flood coater is shown for illustrative purposes. The applicator 310 applies the mixed feed stream 308 containing the first component 304 and the second component 324 to a substrate 314, which is shown for illustration purposes as a fibrous cement substrate sheet moving in the direction of arrow A along a conveyor system including a plurality of rollers 350. The applied mixed feed stream 308 forms a flood coat 312 on at least one surface of the substrate 314. The surface may include one or more major surfaces such as a face of the sheet, and one or more edge surfaces as shown in FIG. 3.

Optionally, as shown in FIG. 3, at least a portion 320 of the applied mixed feed stream 308 is removed from a surface of the substrate 314. FIG. 3 illustrates use of an air knife 316 that impinges air, which may be heated, against the surface of the substrate 314 to remove a portion of the applied mixed feed stream 308 after passage of at least one component penetration time. However, any suitable method may be used to remove a portion of the coating from a surface of the substrate 314, including penetration of the coating into the pores of the substrate 314. For illustrative purposes only, the component penetration time is determined as the time required for a point on the substrate to move from the applicator 310 to the air knife 316, and may be controlled by controlling the linear velocity of the substrate 314 along the plurality of rollers 350.

A portion 320 of the applied mixed feed stream 308 removed from the surface of the substrate 314 may be collected in a pan 318. At least some of the portion 320 of the applied mixed feed stream 308 removed from the surface of the substrate 314 and collected in pan 318 may be recycled in a recycle fluid stream 322, which joins with the mixed feed stream 308, including the first component 304 and the second component 324, in the applicator 310.

Figure 4:
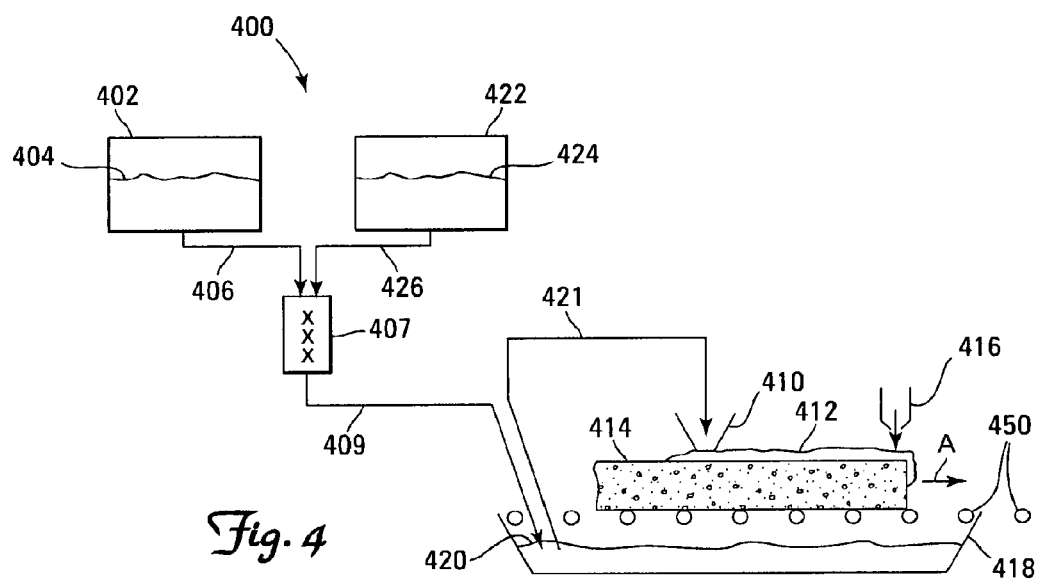
FIG. 4 is a schematic side view diagram illustrating an exemplary method of coating a fibrous cement substrate according to a further embodiment of the present invention.

FIG. 4 illustrates a multi-component coating method 400 according to an additional embodiment of the invention using a single mixer 407. In this illustrative embodiment, a first component 404 is mixed with a second component 424 before application to a substrate 414 at a single application station.

FIG. 4 shows a first storage container, typically a tank 402, containing a first component 404 of a multi-component composition. For example, the first component may be an oxirane-functional chemical compound. A supply fluid stream 406 of the first component 404 is fed from the first storage tank 402 to a mixer 407. For illustration purposes only, a static in-line mixer 407 is shown in FIG. 4, although other types of mixers may be used. FIG. 4 also shows a second storage container, typically a tank 422, containing a second component 424 of a multi-component composition. For example, the second component may be an amino-functional chemical compound. A supply fluid stream 426 of the second component 424 is fed from the second storage tank 422 to the mixer 407.

A mixed feed stream 409 including the first component 404 and the second component 424 is fed from the mixer 407, and the mixed feed stream 409 is fed to a collection pan 418. In some embodiments, the mixed feed stream 409 containing the first component 404 and the second component 424 may further mix with any material in the collection pan 418 that was previously removed from a substrate 414 to form a multi-component coating mixture 420.

A recycle stream 421 from the collection pan 418 is fed to an applicator 410. The recycle stream 421 contains the first component 404 and the second component 424, and any material in the collection pan 418 that was previously removed from a substrate 414. The applicator 410 may be any suitable coating device as described above; however, a flood coater is shown for illustrative purposes.

The applicator 410 applies the recycle stream 421 to a substrate 414, which is shown for illustration purposes as a fibrous cement substrate sheet moving along a conveyor system comprising a plurality of rollers 424. The applied recycle stream 421 forms a flood coat 412 on at least one surface of the substrate 414. The surface may include one or more major surfaces such as a face of the sheet, and one or more edge surfaces as shown in FIG. 4.

As shown in FIG. 4, collection pan 418 may collect material removed from a surface of the substrate 414. FIG. 4 illustrates use of an air knife 416 that directs air, which may be heated, against the surface of the substrate 414 to remove a portion of the applied recycle stream 421 after passage of at least one component penetration time. However, any suitable method may be used to remove a portion of the coating from a surface of the substrate 414, including penetration of the coating into the pores of the substrate 414. For illustrative purposes only, the component penetration time is determined as the time required for a point on the substrate to move from the applicator 410 to the air knife 416, and may be controlled by controlling the linear velocity of the substrate 414 along the plurality of rollers 450 making up the conveyor system in the direction shown by the arrow A.

Figure 5:
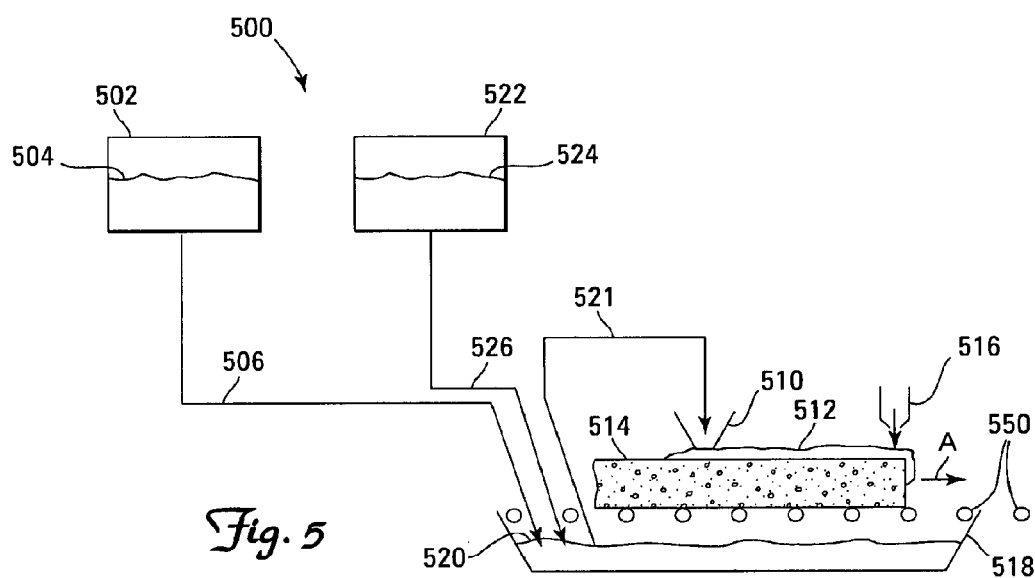
FIG. 5 is a schematic side view diagram illustrating an exemplary method of coating a fibrous cement substrate according to another embodiment of the present invention.

FIG. 5 illustrates a multi-component coating method 500 according to a further embodiment of the present invention. In this illustrative embodiment, a first component 504 is mixed with a second component 524 before application to a substrate 514 at a single application station.

FIG. 5 shows a first storage container, typically a tank 502, containing a first component 504 of a multi-component composition. For example, the first component may be an amino-functional chemical compound. A supply fluid stream 506 of the first component 504 is fed from the first storage tank 502 to a collection pan 518. The collection pan 518 may optionally include a mixer, which is not shown in FIG. 5. FIG. 5 also shows a second storage container, typically a tank 522, containing a second component 524 of a multi-component composition. For example, the second component may be an oxirane-functional chemical compound. A supply fluid stream 526 of the second component 524 is fed from the second storage tank 524 to the collection pan 518. In some embodiments, the first component 504 and second component 524 may mix within the collection pan 518 to form a multi-component coating mixture 520.

A recycle stream 521 from the collection pan 518 is fed to an applicator 510. The recycle stream 521 contains the first component 504 and the second component 524, and any material in the collection pan 518 that was previously removed from a substrate 514. The applicator 510 may be any suitable coating device as described above; however, a flood coater is shown for illustrative purposes.

As shown in FIG. 5, collection pan 518 may collect material removed from a surface of the substrate 514. FIG. 5 illustrates use of an air knife 516 that directs air, which may be heated, against the surface of the substrate 514 to remove a portion of the applied recycle stream 521 after passage of at least one component penetration time. However, any suitable method may be used to remove a portion of the coating from a surface of the substrate 514, including penetration of the coating into the pores of the substrate 514. For illustrative purposes only, the component penetration time is determined as the time required for a point on the substrate to move from the applicator 510 to the air knife 516, and may be controlled by controlling the linear velocity of the substrate 514 along the plurality of rollers 550 making up the conveyor system in the direction shown by the arrow A.

In each of the preceding embodiments, a first component and a second component of a multi-component composition for coating a porous substrate are mixed subsequent to leaving separate storage tanks Mixing may occur prior to application of the multi-component composition to the porous substrate, after application to the porous substrate, or both before and after application to the porous substrate. In the preceding illustrative embodiments, the first and second components are illustrated as an amino-functional chemical compound and an oxirane-functional chemical compound that undergo a chemical reaction (epoxidation) upon mixing. Other embodiments are illustrated by the following examples.

EXAMPLES

In the following illustrative examples, various multi-component compositions are prepared and applied to at least one major surface of a porous substrate. The porous substrate in each case was a fibrous cement substrate sheet having two major surfaces adjoining a multiplicity of edge surfaces, each major surface defining a plane having dimensions of 15.9 cm by 20.3 cm and a surface area of 322.8 square centimeters. In each example, a first component and a second component, capable of undergoing a chemical reaction, were sequentially applied to the porous substrate. The first and second components undergo a curing or cross-linking reaction upon mixing. In each example, an optional third coating composition was also applied to the porous substrate as a topcoat.

In the examples, various amino-functional chemical compounds were used as a first component or a second component, in combination with various oxirane-functional chemical compound used as a corresponding second or first component. For purposes of illustration only, the following amino-functional chemical compounds were used: those available under the trade designations Anquamine 287, Anquamine 360, and Anquamine 701 from Air Products Corp., Allentown, Pa.; and those available under the trade designation EpiLink 360 from Air Products Corp., Allentown, Pa. For purposes of illustration only, the following oxirane-functional chemical compounds were used: those available under the trade designation EpiRez 3515W60 and EpiRez 3522W60 from Resolution Polymers, Inc., Houston, Tex.). In addition, in the examples and for illustration purposes only, a topcoat available from The Valspar Corp., Ashland, Ill. under the trade designation ColorPlus LLW0106 topcoat was applied over the first component and second component on the substrate.

In each of the examples, the first component and the second component were dispersed or dissolved in a carrier liquid, tap water, to achieve a desired percent non-volatile material (% NVM). Percent NVM (% NVM) refers to the percentage of non-volatile material in a coating component, and is generally expressed as a weight percentage.

In each of the examples, a coater available under the trade designation SeaWay Coater from SeaWay, Inc., Snohomish, Wash., was used to apply the first component and the second component, and the topcoat was then applied by curtain coater to a major surface (e.g. a top surface) and the edges of the fibrous concrete substrate boards. A "flood and blow" method was used to apply the first component and the second component, in which a component was applied to one or more surfaces of the substrate as a flood coat, a penetration time period was allowed to elapse, and an air knife impinged air against the coated surfaces, thereby "blowing off" a portion of the applied coating from the coated surfaces.

In addition to the application rate determined by the flow rate of the coating component through the applicator, the coating weight applied to the substrate may be controlled by adjusting the distance of the air knife from the substrate and the velocity and temperature of the air impinging upon the substrate, with shorter distance and higher velocity generally producing lower coating weights. Coating weight refers to the weight of a component, expressed on a dry solid weight basis, applied to a surface, expressed as a surface area, and is generally reported in grams per square meter ($g/m^2$).

The penetration time period may be determined from the rheological properties of the applied component, the surface tension of the applied component, the porosity and relative hydrophilicity of the substrate, the application temperature and the humidity and moisture content of the substrate. Lower viscosity, lower % NVM and lower surface tension generally favor more rapid penetration and shorter penetration times, whereas higher substrate porosity and hydrophilicity, higher application temperature and higher humidity generally favor more rapid penetration and shorter penetration times. In particular, too high a % NVM value for the first-applied component may be undesirable for sequentially applied coating components, because the first-applied component may act to seal the porous surface and prevent penetration of the second-applied component into the substrate, possibly resulting in poor reaction of the components and low adhesion to the substrate.

In the illustrative examples, rheological properties were determined at low shear rate corresponding to coating leveling and penetration into the porous substrate for some of the components of the multi-component compositions. Viscosities were measured at approximately 22-23° C. using a Brookfield DV-II viscometer (available from Brookfield Engineering Laboratories, Inc., Middleboro, Mass.) equipped with a number two spindle and operating at 100 rpm. Measured Brookfield viscosities generally were from about 1 to about centipoises (cP), more preferably from about 5 to about 100 cP, most preferably from about 10 to about 30 cP.

In the illustrative examples, the fibrous concrete boards were heated before and/or after application of each component, and the board surface temperatures (BST) were recorded. BST refers to the board surface temperature, that is, the temperature of the substrate surface, expressed in degrees Celsius.

After application of the multi-component coating compositions to the fibrous cement substrates and curing of the composition, the coated substrates were tested for adhesion of the applied coating and water permeability. Adhesion of the coating to the porous substrate was determined at least 24 hours after coating generally according to ASTM Test Method D 3359-97, by applying a strip of adhesive tape (250HB tape available from 3M Company, St. Paul, Minn.) to the substrate's major coated surface using a roller or other device to ensure good contact between the tape and the substrate, then rapidly pulling an end of the tape strip to remove the tape from the surface without first cutting an "X-pattern" into the surface of the tape.

The adhesive side of the tape was then examined for evidence that a portion of the fibrous substrate and/or the applied topcoat had been removed with the tape, thereby adhering and partially occluding the tape surface. Ratings of A-E were assigned to this Dry Adhesion test result based on the visually-observed extent of substrate and/or topcoat removal by the tape according to the following scale: A: 0% removed; B: 1-10% removed; C: 11-25% removed; D: 26-50% removed; and E (>50% removed). Additionally, a plus (+) or (−) was assigned within a rating to indicate the closest adjacent rating (e.g. an A− rating is closer to a B+ rating than to an A rating; a B+ rating is closer to an A− rating than to a B rating, and the like). An A rating is preferred over a B rating, which is preferred over a C rating, and so on.

In addition, a Wet Soak test was carried out on the coated substrates at least 24 hours after coating in order to assess the water permeability of the applied multi-component coating composition. In the Wet Soak test, the substrate was submerged in water for 24 hours, then removed and dried. The Dry Adhesion test according to the above method was then carried out on the sample, and a rating assigned as above.

Preferably, the Dry Adhesion rating after the Wet Soak is unchanged from the original Dry Adhesion rating, with the extent of difference between the two ratings providing a relative measure of the extent of water penetration into the sample, thereby damaging or causing deterioration of the fibrous cement substrate surface. The results are summarized in Table I.

TABLE I

| Example Number | First Applied Component & NVM (% w/w) | First Applied Coating Weight (g) | First Applied BST (° C.) | Second Applied Component & NVM (% w/w) | Second Applied Coating Weight (g) | Second Applied BST (° C.) | Third Applied Component & NVM (% w/w) | Third Applied Coating Weight (g) | Third Applied BST (° C.) | Dry Adhesion A-E Scale | Wet Soak A-E Scale |
|---|---|---|---|---|---|---|---|---|---|---|---|
| 1 | EpiLink 360 5.6% in tap water | 4.12 | 87.8 | 3515W60 12.5% in tap water | 2.17 | 107.2 | LLW0106 Topcoat 10% in tap water | 4.27 | 82.8 | A | C |
| 2 | 3515W60 12.5% in tap water | 2.60 | 87.8 | EpiLink360 5.6% in tap water | 4.64 | 107.2 | LLW0106 Topcoat 10% in tap water | 4.12 | 80.0 | A | B |
| 3 | EpiRez 3525W60 12.5% in tap water | 2.00 | 110.0 | Anquamine 287 12.5% in tap water | 2.01 | 111.1 | LLW0106 Topcoat 10% in tap water | 3.89 | 80.0 | — | — |
| 4 | EpiRez 3525W60 12.5% in tap water | 3.16 | 109.4 | Anquamine 287 12.5% in tap water | 2.78 | 111.7 | LLW0106 Topcoat 10% in tap water | 4.27 | 76.7 | — | — |
| 5 | Anquamine 287 12.5% in tap water | 2.18 | 106.1 | EpiRez 3525W60 12.5% in tap water | 2.30 | 110.6 | LLW0106 Topcoat 10% in tap water | 4.04 | 79.4 | — | — |
| 6 | Anquamine 287 12.5% in tap water | 3.18 | 110.6 | EpiRez 3525W60 12.5% in tap water | 3.80 | 108.3 | LLW0106 Topcoat 10% in tap water | 4.30 | 79.4 | — | — |
| 7 | 50/50 Anquamine 701/Anquamine 360 15% in tap water | 3.40 | 79.4 | EpiRez 3515W60 15% in tap water | 2.60 | 107.2 | LLW0106 Topcoat 10% in tap water | 2.80 | — | A | — |
| 8 | 50/50 Anquamine 701/Anquamine 360 15% in tap water | 3.00 | 82.2 | EpiRez 3515W60 15% in tap water | 3.60 | 115.6 | LLW0106 Topcoat 10% in tap water | 4.30 | — | A | — |
| 9 | EpiRez 3515W60 15% in tap water | 3.20 | 93.3 | 50/50 Anquamine 701/Anquamine 360 15% in tap water | 3.20 | 90.6 | LLW0106 Topcoat 10% in tap water | 3.30 | — | B | — |
| 10 | EpiRez 3515W60 15% in tap water | 3.00 | 99.4 | 50/50 Anquamine 701/Anquamine 360 15% in tap water | 3.30 | 82.2 | LLW0106 Topcoat 10% in tap water | 3.60 | — | A | — |
| 11 | EpiRez 3515W60 15% in tap water | 2.80 | 83.3 | 50/50 Anquamine 701/Anquamine 360 15% in tap water | 2.60 | 77.2 | LLW0106 Topcoat 10% in tap water | 3.75 | — | A | — |
| 12 | 50/50 Anquamine 701/Anquamine 360 15% in tap water | 2.47 | 65.6 | EpiRez 3515W60 15% in tap water | 2.70 | 65.6 | LLW0106 Topcoat 10% in tap water | 3.75 | — | A | B |
| 13 | 50/50 Anquamine 701/Anquamine 360 15% in tap water | 2.56 | 76.7 | EpiRez 3515W60 15% in tap water | 2.45 | 60.0 | LLW0106 Topcoat 10% in tap water | 3.35 | — | A | B+ |
| 14 | EpiRez 3515W60 15% in tap water | 3.20 | 72.2 | 50/50 Anquamine 701/Anquamine 360 15% in tap water | 2.60 | 67.2 | LLW0106 Topcoat 10% in tap water | 3.02 | — | A | B |
| 15 | EpiRez 3515W60 15% in tap water | 2.90 | 60.0 | 50/50 Anquamine 701/Anquamine 360 15% in tap water | 2.60 | 65.6 | LLW0106 Topcoat 10% in tap water | 3.29 | — | A- | B |
| 16 | 75/25 Anquamine 701/Anquamine 360 10% in tap water | 0.40* | 46.7 | EpiRez 3515W60 15% in tap water | 0.45* | 47.2 | N/A | N/A | N/A | A | A |

TABLE I-continued

| | First Applied Component | | | Second Applied Component | | | Third Applied Component | | | Dry Adhesion A-E Scale | Wet Soak A-E Scale |
|---|---|---|---|---|---|---|---|---|---|---|---|
| Example Number | Component & NVM (% w/w) | Coating Weight (g) | BST (° C.) | Component & NVM (% w/w) | Coating Weight (g) | BST (° C.) | Component & NVM (% w/w) | Coating Weight (g) | BST (° C.) | | |
| 17 | 75/25 Anquamine 701/Anquamine 360 15% in tap water | 0.45* | 46.7 | EpiRez 3515W60 15% in tap water | 0.45* | 47.2 | N/A | N/A | N/A | A | A |

*Expressed as dry film thickness in mils;
N/A denotes not applied

All patents, patent applications, and literature cited in the specification are hereby incorporated by reference in their entirety. In the case of any inconsistencies, the present disclosure, including any definitions therein will prevail. The invention has been described with reference to various specific and preferred embodiments and techniques. However, it should be understood that many variations and modifications may be made while remaining within the spirit and scope of the invention. The foregoing detailed description of the present invention is not intended to describe every embodiment or every implementation of the present invention.

Various embodiments of the invention have been described. These and other embodiments are within the scope of the following claims.

The invention claimed is:

1. A method of coating a porous fibrous cement substrate, comprising the steps of:
   providing a multi-component coating composition comprising:
   a first component comprising an isocyanate compound, and
   a second component comprising an amino-functional compound reactive with the isocyanate compound or a hydroxyl-functional compound reactive with the isocyanate compound, wherein each component in the multi-component coating composition is housed in a separate container prior to application to a surface of a porous fibrous cement substrate;
   applying each of the first and the second component to the surface at a selected application rate for each component, wherein the first component is applied to the surface before the second component is applied to the surface, and wherein the first component penetrates into the surface for a penetration time before applying the second component;
   removing at least a portion of the first component from the surface after allowing at least some of the first component to penetrate into the surface for the penetration time;
   allowing the first component and the second component to mix on the surface to form the multi-component coating composition thereon, wherein the first component and the second component undergo a chemical reaction on the surface.

2. The method of claim 1, wherein the porous fibrous cement substrate comprises a fibrous cement board.

3. The method of claim 1, wherein the second component comprises an amino-functional compound.

4. The method of claim 3, wherein the amino-functional compound comprises at least one group with a nitrogen atom having a lone pair of electrons.

5. The method of claim 4, wherein the group is selected from NH or $NH_2$.

6. The method of claim 1, wherein the multi-component coating composition further comprises at least one additive selected from the group consisting of a catalyst, a wetting agent, or a rheology control agent.

7. The method of claim 1, wherein the penetration time for the first component is about 0.5 seconds to about 5 seconds.

8. The method of claim 1, wherein removing at least a portion of the first component of the multi-component coating composition from the surface of the porous substrate comprises directing a gas stream against at least a portion of the surface after allowing at least some of the first component to penetrate into the surface for the penetration time.

9. The method of claim 1, wherein applying each component to the surface comprises coating the component onto the surface by one or more of brush coating, knife coating, direct roll coating, reverse roll coating, spray coating, extrusion die coating, curtain coating, flood coating and vacuum coating.

10. The method of claim 1, further comprising drying the first component on the surface prior to application of the second component.

11. The method of claim 1, further comprising heating the surface before and after applying the first or the second component.

12. A method, comprising:
   housing a first component in a first container, wherein the first component comprises an isocyanate compound;
   housing a second component in a second container different from the first container, wherein the second component comprises an amino-functional compound reactive with the isocyanate compound;
   applying the first component to a surface of a fiber cement substrate at a selected first component application rate;
   removing at least a portion of the first component from the surface by directing a gas stream against at least a portion of the surface, wherein the first component is removed after allowing at least some of the first component to penetrate into the surface for a penetration time;
   applying the second component on the first component at a selected second component application rate; and
   allowing the first component and the second component to mix on the surface, wherein the first component and the second component undergo a chemical reaction on the surface.

13. The method of claim 12, wherein the fiber cement substrate comprises a fibrous cement board.

14. The method of claim 12, wherein the amino-functional compound comprises a group selected from NH or $NH_2$.

* * * * *